Jan. 17, 1956          J. L. WINGATE          2,730,985

IMPLEMENT FOR ENGAGING A LINE WITH A REMOTE OBJECT

Filed Aug. 20, 1953          2 Sheets-Sheet 1

United States Patent Office 2,730,985
Patented Jan. 17, 1956

2,730,985

IMPLEMENT FOR ENGAGING A LINE WITH A REMOTE OBJECT

John L. Wingate, Snitterfield, near Stratford-on-Avon, England

Application August 20, 1953, Serial No. 375,426

Claims priority, application Great Britain September 30, 1952

6 Claims. (Cl. 114—230)

This invention relates to a hooked implement, like a boat hook, of the kind adapted for engaging a line with a remote object such as a stanchion, or a mooring loop, hook or ring, for example, of a buoy.

According to the invention the hook portion is slidably mounted for limited axial movement on the end of its support, and its extremity provides a detachable location for a part to be made fast with the end of the line, which latter passes along the convex edge of the hook portion, such that, when the remote object is entered into the hook, a pull on the line will slide the hook portion to carry the said part into a position to be engaged by a barb on the said end of the support so as to enclose the remote object, whilst when the support is pulled the hook portion will slide in the other direction with the barb engaging the said part from the far side to disengage the said part from the hook portion and to pull the line across the opening left between them.

The said extremity can then be moved out of engagement with the remote object, leaving the latter retained by a bight formed from the portion of the line which was drawn across the said opening, and, after the said end of the line, together with the said part, has been pulled inboard, the line can be disengaged from the said part to leave both ends of the line in the hand of the operator.

The said part can be an eye fast with the line and detachably engaged with the hook portion or, according to a further feature of the invention the said part is detachable nose of the hook portion, the adjacent end of the remainder of the latter and the nose having coacting surfaces which, when the line is pulled, engage to prevent the nose from moving in the direction to increase the normal hook opening (i. e., whereby the implement can additionally be used as a boat hook) and which, when the support is pulled with its barb engaging the nose, disengages these surfaces to detach the nose from the remainder of the hook portion. In this case the nose, after being pulled inboard, can be detached from the line for re-use.

According to yet another feature the detachable nose of the hook portion and the support have coacting surfaces for preventing accidental disengagement of the barb during use of the implement.

Figure 1:
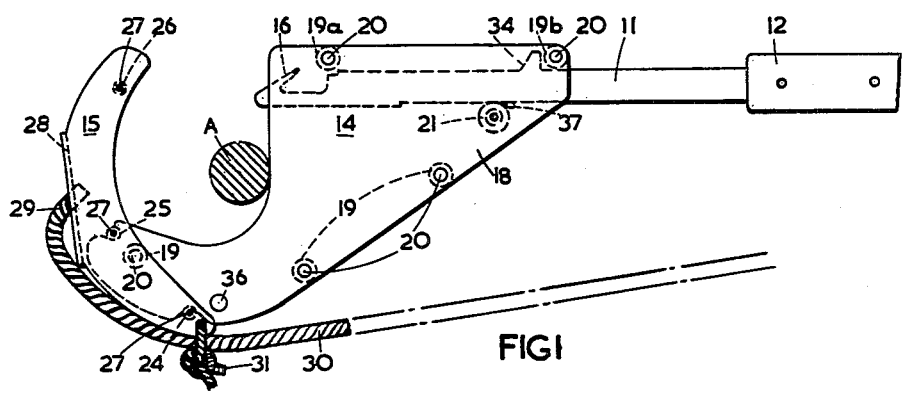
Figures 1 to 3 are side elevations, with the handle end shown broken away, of one form of the implement showing three phases of the operation of passing a line round a remote object.
Figure 2:
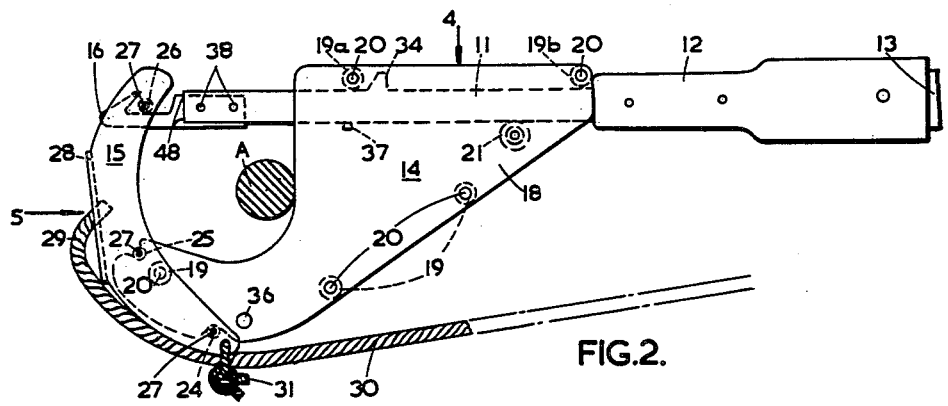
Figure 3:
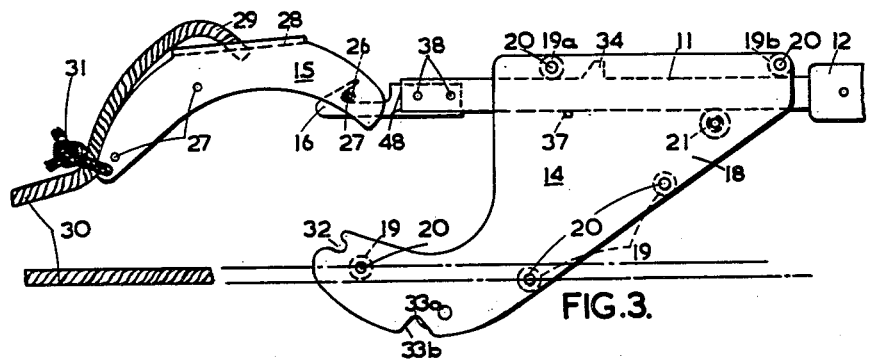

Referring firstly to Figures 1 to 3, the implement includes a support 11 of rectangular cross-section which is fast with a socket 12 in the open end of which can be secured an end of a shaft 13.

The hook portion is indicated generally at 14 and it has a detachable nose portion 15 defining with it a lateral opening through which a remote object, indicated at A, can be engaged.

Figure 4:
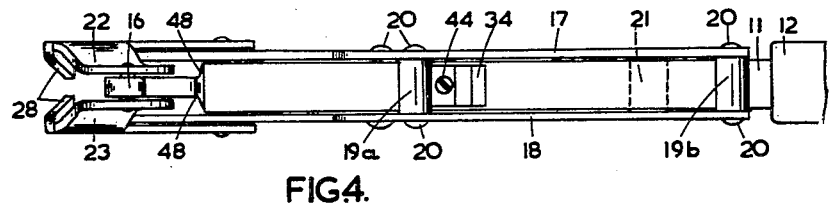
Figure 4 is a view of the implement looking in the direction of the arrow 4 of Figure 2.
Figure 5:
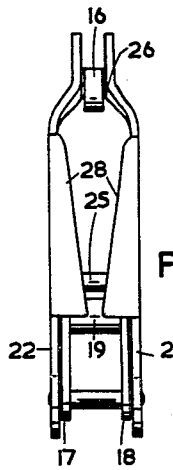
Figure 5 is a view looking in the direction of the arrow 5 of Figure 2.

The support 11 is provided at its unsupported end with a barb 16 and is guided for axial-sliding relatively to the hook portion. For this purpose, and as will best be seen from Figure 4, the hook portion is made from spaced plates 17, 18 which are interconnected by distance pillars 19, 19 with ends of reduced diameter which are peened over as shown at 20, 20. Two of these pillars, marked 19a and 19b in the drawings, form guides for one side surface of the support 11, the latter being biassed into contact with them by a roller 21, with a durable, resiliently-compressible tyre, which is journalled in the plates 17, 18 and bears against the opposite side surface of the support. The two intermediate side surfaces of the support are guidingly engaged by the adjacent faces of the plates 17, 18.

The detachable nose 15 is also made from spaced plates 22, 23 which are held together by distance pillars 24, 25 and 26 with reduced-diameter ends peened over as shown at 27. The plates 22, 23 have inturned flanges 28 jointly defining a wedge-shaped space in which the outboard end 29 of a line 30 can be jammed, and these plates are conveniently provided with aligned through-holes for supporting a face 31 by which the line can be held for preventing disengagement of its outboard end 29 from the wedge-shaped space.

In Figures 1 and 2 the detachable end portion is shown in its assembled position in which, when the line 30 is kept in tension from the inboard end, the distance pillar 25 is held engaged in a notch 32 at the extremity of the hook portion. In this position the distance pillar 24 abuts a stop 33a (see Figure 3) in the hook portion for firmly supporting the nose portion against counter-clockwise turning (i. e., in the figure) about the pillar 25 when, for example, the implement is being used as a boat hook. A further stop 33b prevents the pillar 25 from being disengaged from the notch 32.

In operation, the implement, with the hook portion slid forwardly for the pillar 19b to engage a stop 34 (i. e., in the condition shown in Figure 1), is engaged with the remote object A and the line 30 then pulled sharply from the inboard end to bring the implement to the condition shown in Figure 2, in which latter the hook portion abuts the adjacent end of the socket 12. In reaching the position of Figure 2 the ramp of the barb engages the distance pillar 26 of the nose portion 15, and the compressibility of the tyre of the roller 21 allows the support to be pivotally deflected about the pillar 19b for the pillar 26 to engage behind the barb as shown. The pull on the inboard end of the line 30 is then slackened and the whole implement pulled by the handle 13. This causes the remote object firstly to bear against, and be located by, the concave inner surface of the nose portion 15, and then to tilt the latter for disengaging the pillars 24 and 25 from the stop 33b and notch 32 respectively and in that order. The nose portion is thus released to pass across the remote object and to allow further pulling on the handle to permit the object to pass freely through the opening thus afforded whereby to pick up a bight of the line as indicated in Figure 3, the remote object not being shown in the latter.

When the implement is drawn inboard the end 29 of the line can be detached from the portion 15 and, for example, made fast and leave the implement free for re-assembling for an immediate further use, or for stowing. For holding the nose portion in position when the implement is stowed the ends of the lace 31 can be passed through aligned holes 36, 36 of the plates 17 and 18 and knotted together.

Preferably the roller 21 is nearer to the pillar 19b than to the pillar 19a as a less force is required to deflect the support 11 for the barb to engage the pillar 36 than would be required to deflect it in the opposite direction in the event that the pillar 26 encounter the barb end on.

For lightly locating the parts in the position of Figure 1 when offering up the implement to the object A, the support is provided with a stop 37 which coacts with the compressible tyre of the roller 21 but can ride over it to permit the relative positions shown in Figure 2 to be assumed.

Figure 7:
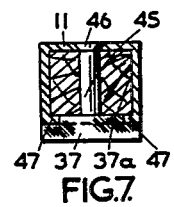
Figure 7 is a section on the line 7—7 of Figure 6 and drawn to the same enlarged scale.
Figure 6:
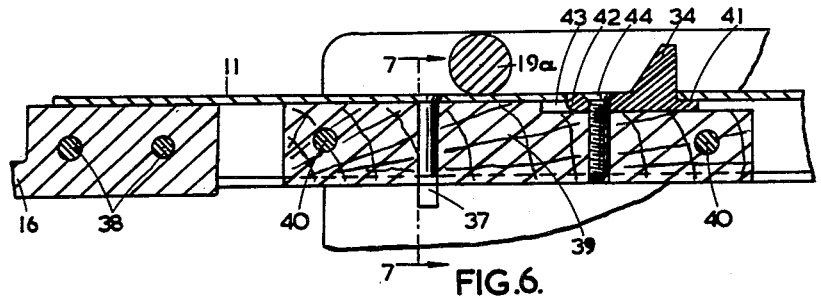
Figure 6 is a longitudinal section through a portion of the support drawn to an enlarged scale.

For reducing the moment of the implement when held at arm's length it can be made of light alloy, but it is preferred for the support 11 to be of stainless steel, and of channel-section as shown in Figures 6 and 7, and for the barb to be of naval brass and riveted in position as indicated at 38 in Figures 2, 3 and 6.

Referring to Figures 6 and 7 the open side of the channel faces inwardly and, for providing anchorages for the fixing means (to be described later) for the stops 34 and 37 the channel has a hard-wood insert 39 which is held in position by rivets 40, 40. By forming the insert with a fillet engaging between lips 47, 47 at the open side of the channel, as shown in Figure 7, a planar track for the roller 21 is provided.

The closed side of the channel is formed with a window through which a flange 41 of a platform of the stop 34 can be first inserted to engage under an edge of the window, and the platform has an oppositely-directed flange 42 which has a rounded edge for enabling the platform to be moved angularly into position for abutting the opposite edge of the window. As shown, the insert 39 is recessed at 43 to accommodate the platform, and the latter is then held in position by a screw 44 engaging the insert.

As shown in Figure 7 the stop 37 extends for the full width of the support and it has an integral stem 45 which, after passing through the insert has its unattached end peened at 46 into a countersink of the support. The stop 37 also has a portion 37a of reduced width for engaging in a transverse groove of the insert and between the lips 47, 47 of the channel whereby to prevent the stop from turning about the axis of the stem 45.

For preventing unintended disengagement of the barb from the pillar 26 while drawing in the line, the plates 22, 23 of the nose portion are extended beyond the said pillar so as, when the nose portion has been detached as shown in Figure 3, to be spaced from shoulders 48, at the sides of the barb, by a distance which is less than that necessary for the disengagement to take place.

What I claim as my invention and desire to secure by Letters Patent of the United States is:

1. A hooked implement, for engaging a line with a remote object, including a support, a hook portion slidably mounted on an end portion of said support for axial movement on the latter between a position in which said end portion bridges the hook opening and a position in which said end portion leaves said hook opening unobstructed, a part to which an end of a line to be passed round the back of said hook portion is to be made fast, means providing a releasable engagement between said part and an extremity of said hook portion, a barb on said end portion, and means on said part to be engaged by said barb, such that, when the hook opening in unobstructed condition is engaged around the remote object, and an opposite end of said line is pulled, said hook portion is slid for said end portion to bridge the hook opening and to engage said barb with said means on said part, whilst when said support is pulled said hook portion will slide in the other direction for said barb to detach said part from said extremity and pull a length of the line across an opening which is thus created between said part and said extremity and through which said remote object can pass out with a bight of the line engaged with it.

2. A hooked implement, for engaging a line with a remote object, including a support, a hook portion comprising a main portion and a detachable nose portion, said hook portion slidably mounted on an end portion of said support for axial movement on the latter between a position in which said end portion bridges the hook opening and a position in which said end portion leaves said hook opening unobstructed, coacting surfaces of said main portion and said nose portion preventing the latter from moving in the direction to increase the normal hook opening but permitting it to tilt in the direction for reducing said opening, means on said nose portion providing an anchorage to which an end of a line to be passed round the back of said hook portion is to be made fast, a barb on said end portion, and means on said nose portion to be engaged by said barb, such that, when the hook opening in unobstructed condition is engaged around the remote object, and an opposite end of said line is pulled, said hook portion is slid for said end portion to bridge the hook opening and to engage said barb with said means on said nose portion, whilst when said support is pulled said hook portion will slide in the other direction for said barb to detach said nose portion from said main portion and pull a length of the line across an opening which is thus created between said nose and main portions and through which said remote object can pass out with a bight of the line engaged with it.

3. A hooked implement, for engaging a line with a remote object, including a support, a hook portion comprising a main portion and a detachable nose portion, said hook portion slidably mounted on an end portion of said support for axial movement on the latter between a position in which said end portion bridges the hook opening and a position in which said end portion leaves said hook opening unobstructed, said nose portion serving as an anchorage for an end of a line to be passed round the back of said main portion, means providing a releasable engagement between said nose portion and an extremity of said main portion, a barb on said end portion, means on said nose portion to be engaged by said barb, such that, when the hook opening in unobstructed condition is engaged around the remote object, and an opposite end of said line is pulled, said hook portion is slid for said end portion to bridge the hook opening and to engage said barb with said means on said nose portion, whilst when said support is pulled said hook portion will slide in the other direction for said barb to detach said part from said extremity and pull a length of the line across an opening which is thus created between said nose portion and said extremity and through which said remote object can pass out with a bight of the line engaged with it, and said support and said nose portion provided with coacting surfaces for preventing accidental disengagement of said barb during use of the implement.

4. A hooked implement, according to claim 1, in which for making fast the end of the line said part is provided with surfaces defining a convergent space in which said end of said line is to be jammed.

5. A hooked implement, according to claim 1, in which said part is provided with a lace for lashing the line thereto remotely from where said line is made fast with said part.

6. A hooked implement, for engaging a line with a remote object, including a support, a hook portion comprising a main portion and a detachable nose portion, said hook portion slidably mounted on an end portion of said support for axial movement on the latter between a position in which said end portion bridges the hook opening and a position in which said end portion leaves said hook opening unobstructed, said nose portion serving as an anchorage for an end of a line to be passed round the back of said main portion, means providing a releasable engagement between said nose portion and an extremity of said main portion, a barb on said end portion, and means on said nose portion to be engaged by said barb, such that, when the hook opening in unobstructed condition is engaged around the remote object, and an opposite end of said line is pulled, said hook portion is slid for said end portion to bridge the hook opening and to engage said barb with said means on said nose portion, whilst when said support is pulled said hook portion will slide in the other direction for said barb to detach said nose portion from said extremity and pull a length of the line across an opening which is thus created between said nose portion and said extremity and through which said remote object can pass out with a bight of the line engaged with it, and resilient means acting laterally between said main portion and said end portion to permit slight relative tilting in the plane of said barb for enabling the latter to ride past, and engage behind, said means on said nose portion.

References Cited in the file of this patent

UNITED STATES PATENTS

| | | |
|---|---|---|
| 2,347,718 | Terry | May 2, 1944 |
| 2,550,770 | Calemmo | May 1, 1951 |

FOREIGN PATENTS

| | | |
|---|---|---|
| 287,407 | Great Britain | Mar. 22, 1928 |
| 442,857 | Great Britain | Feb. 13, 1935 |